United States Patent [19]

Tamamushi et al.

[11] Patent Number: 4,914,882
[45] Date of Patent: Apr. 10, 1990

[54] BUTT ARRANGEMENT OF TRIM PARTS FOR A VEHICLE

[75] Inventors: Masahiro Tamamushi, Machida; Masamitsu Matsuki, Sagamihara, both of Japan

[73] Assignee: Nissan Motor Co., Ltd., Yokohama, Japan

[21] Appl. No.: 465,206

[22] Filed: Feb. 9, 1983

[30] Foreign Application Priority Data

Feb. 16, 1982 [JP] Japan .................. 57-23150

[51] Int. Cl.⁴ .............................................. B62D 25/04
[52] U.S. Cl. ...................................... 52/287; 52/288; 52/716; 296/93
[58] Field of Search ................. 52/716, 288, 460, 461, 52/540, 518, 519, 287, 289, 290; 296/93

[56] References Cited

U.S. PATENT DOCUMENTS

| 225,845 | 3/1880 | Martin .................................... 52/288 |
| 1,936,507 | 11/1933 | Green .................................... 52/287 |
| 3,467,423 | 9/1969 | Schlegel, Jr. et al. ................. 52/716 |

FOREIGN PATENT DOCUMENTS

| 160577 | 1/1955 | Australia .............................. 296/93 |
| 2415177 | 9/1979 | France ................................. 52/518 |
| 56-83570 | 3/1980 | Japan . |
| 1389075 | 4/1975 | United Kingdom ................. 52/288 |

Primary Examiner—Richard E. Chilcot, Jr.
Attorney, Agent, or Firm—Foley & Lardner, Schwartz, Jeffery, Schwaab, Mack, Blumenthal & Evans

[57] ABSTRACT

A butt arrangement of two trim parts to be attached on the inner surface of a body panel for use in a vehicle such as an automobile, comprises a first and a second transverse portion. The first trim part includes a first longitudinal portion extending along the inner surface of the body panel and the first transverse portion. The first transverse portion extends from an edge on the vehicle passengers side of the first longitudinal portion toward the body panel at an obtuse angle to the first longitudinal portion. The second trim part includes the second transverse portion and a second longitudinal portion extending along the inner surface of the body panel. The second transverse portion extends from an edge on the first trim part side of the second longitudinal portion so that it is in parallel to the first transverse portion with a clearance, thereby to restrain the floating of the first trim part and to reduce the unpleasant protruding feeling and unsightliness at the assembling section while increasing the safety.

3 Claims, 1 Drawing Sheet

BUTT ARRANGEMENT OF TRIM PARTS FOR A VEHICLE

BACKGROUND OF THE INVENTION

The present invention relates to trim parts for a vehicle such as a motor vehicle or the like, and more particularly to a butt arrangement of trim parts, which can get rid of unsightliness at the butt arrangement portion of the trim parts.

In a conventional vehicle such as an automobile or the like, a plurality of trim parts are attached onto the inner surface of a panel of a body for better interior finish. The butt arrangement of the trim parts requires a special technique in consideration of such circumstances.

FIGS. 1, 2 and 3 illustrate an example of such conventional butt arrangements of trim parts, wherein a trim parts assembling section of an automobile 10 has a roof side panel 12 and a plurality of trim parts: a front roof garnish 14, a windshield garnish 16, and a roof side garnish 18. Reference numerals 20 and 22 indicate an instrument assembly and a front seat, respectively. The windschield garnish 16, referred as to a first trim part, is abutted to the roof side garnish 18, as a second trim part, so as to form a butt arrangement portion.

The first trim part 16 has a first longitudinal portion 24 which extends substantially in parallel to an inner surface of the roof side panel 12, as a body panel hereinafter, and a first transverse portion 26 which extends from the edge of the first longitudinal portion 24 near the second tirm part 18 toward the surface of the body panel 12 to form continuously a substantially right angle bend as shown in FIG. 3. On the other hand, the second trim part 18 has a second longitudinal portion 28 which extends substantially in parallel to the inner surface of the body panel 12 and a second transverse portion 30 which extends at substantially a right angle from the edge of the second longitudinal portion 28 near the first trim part 16 to the surface of the body panel 12, so as to form a clearance, having a width of L, between the first transverse portion 26 and the second transverse portion 30.

In the above-described butt arrangement, the first transverse portion 26 is located just beyond the second transverse portion 30 in the direction from a view "E" which is at the position of the eyes of vehicle passengers sitting on the front seat 22 to the butt arrangement portion, so that the clearance having a width of L is hardly seen due to tolerance absorption. The term "vehicle passengers" is sued herein to mean persons being conveyed by the vehicle. However, in the structure of such a conventional butt arrangement as described above, the first and second transverse portion 26 and 30 are at substantially right angles to the first and second longitudinal portion 24 and 28, respectively; consequently, the clearance, deep groove, between the first and second transverse portion 26 and 30 can be easily observed, this causes a problem of unsightliness.

In addition, since the corner angle of the first transverse portions 26 to the first longitudinal portion 24 is an acute angle, this may give an unpleasant protruding feeling. In particular, there is a defect that the protruding feeling is increased where the first intersection surface 9 is peeled off from the surface of the body panel 12 as shown by a dotted line of FIG. 3.

SUMMARY OF THE INVENTION

It is therefore an object of the present invention to provide a butt arrangement of trim parts which can get rid of the unsightly feeling of vehicle passengers in a vehicle.

It is another object of the invention to provide a butt arrangement of trim parts which can improve the outside appearance with a minimized protruding feeling and misalignment feeling of the trim parts at the butt arrangement portion.

It is a further object of the invention to provide a butt arrangement of tirm parts adapted to be prevented from the floating movement of the trim parts when the trim part is peeled off, thereby minimizing the protrusion thereof, and which can improve the safety as the countermeasure for such projection by way of a simple arrangement.

Briefly described, these and other objects of the present invention are accomplished by the provision of an improved butt arrangement of trim parts which comprises a first and a second transverse portion. The first trim part includes a first longitudinal portion extending along the inner surface of the body panel and the first transverse portion. The first transverse portion extends from an edge on the vehicle passengers side of the first longitudinal portion toward the body panel at an obtuse angle to the first longitudinal portion. The second trim part includes the second transverse portion and a second longitudinal portion extending along the inner surface of the body panel. The second transverse portion extends from an edge on the first trim part side of the second longitudinal portion so that it is in parallel to the first transverse portion with a clearance.

BRIEF DESCRIPTION OF THE DRAWINGS

These and other objects, features and advantages of the present invention will be more apparent from the following description of a preferred embodiment, taken in conjunction with the accompanying drawings, in which.

DESCRIPTION OF THE PREFERRED EMBODIMENT

Figure 1:
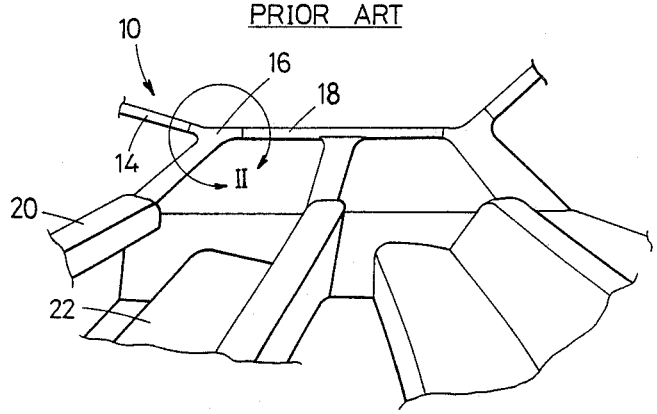
FIG. 1 is a schematic front view of a conventional trim parts assembling section in an automobile.
Figure 2:
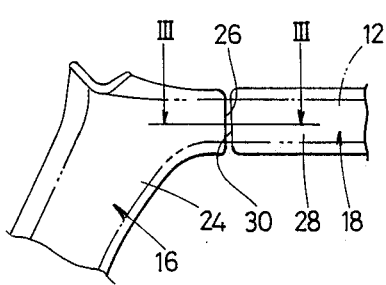
FIG. 2 is an enlarged detail within the circular arrow II in FIG. 1.
Figure 4:
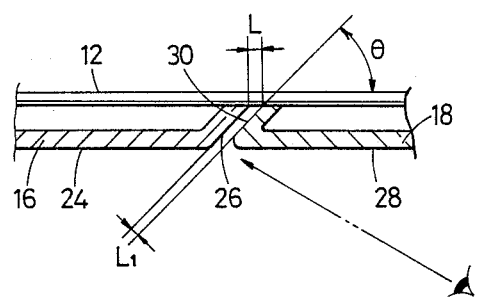
FIG. 4 is a horizontal sectional view of a butt arrangement of trim parts in accordance with the present invention.
Figure 3:
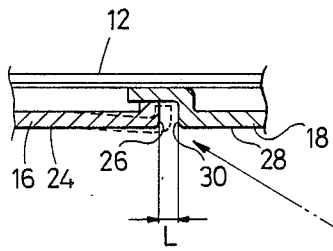
FIG. 3 is a sectional view of the conventional butt arrangement taken along line III-III of FIG. 2.
Figure 5:
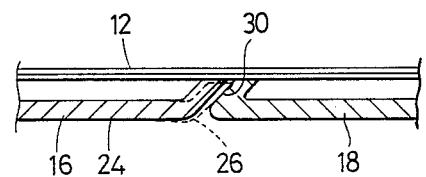
FIG. 5 is a schematic view for describing the function of the construction of FIG. 4.

Referring now to FIGS. 4 and 5, the same reference numerals indicate the similar and corresponding components as conventional ones of FIGS. 1, 2 and 3. A trim parts assembling section of this embodiment comprises a body panel 12, roof side panel, a first trim part 16, windshield garnish on the side apart from the viewpoint E which is located at the eyes of vehicle passengers, and a second tirm part 18, i.e., roof side garnish, on the side near the viewpoint. E.

The first trim part 16 of the present invention has the first longitudinal portion 24 and the first transverse portion 26 which form an obtuse angle ($180° - \theta$; wherein $0° < \theta < 90°$) relative to one another at the end of the first trim part 16. The second trim part 18 has the second transvere portion 30 which is formed substantially in parallel with the first transverse portion 26 with a substantial gap "L1" (=L sin θ) therebetween. Therefore, although the angle of the second transverse portion 30 to a second longitudinal portion 28 is an acute angle θ(0°<θ<90°), the vehicle passengers don't feel the acute angle or uncomfortable protruding feeling since this bending area faces to the side near the viewpoint E.

For construction of such trim parts as mentioned above, the first trim part 16 is first attached to the body panel 12, then the second trim part 18 is attached thereto.

The function of the butt arrangement of the trim parts according to the embodiment will be described hereinbelow. Although the first transverse portion 26 and the first longitudinal portion 24 of the first trim part 16 can be well observed from a passenger, its angle is very obtuse and gentle, so that this arrangement does not give an unpleasant protruding feeling or misalignment feeling. Moreover, it provides a complete interior finish. And, a certain location of the eyes of vehicle passengers make it easy to design the butt arrangement having the advantages mentioned above.

In addition, as shown by a dotted line of FIG. 5, even if the first trim part 16 is removed form the inner surface of the body panel 2, its floating is restricted by the second transverse portion 30 which is in parallel to the first transverse portion 26. At the same time, since the angle is obtuse as mentioned above, its projection is inconspicuous and the safety is also increased.

Although a preferred embodiment of the invention is specifically illustrated and described herein, it will be appreciated that many modifications and variations of the present invention are possible in light of the above teachings and within the purview of the appended claims without departing from the spirit and intended scope of the invention.

What is claimed is:

1. A trim assembly for the compartment of a motor vehicle adapted to accommodate a passenger at a predetermined vantage point comprising:

a first trim part attached on an inner surface of a body panel in the vehicle and forward of said vantage point extending partially and generally along the inner surface to one side and above said vantage point and terminating at a first position forward of said vantage point;

a second trim part attached on the inner surrface of the body panel for extending along the inner surface from said first position and past said vantage point;

said first part being bent toward the inner surface of the body panel at an obtuse angle in order to form a first trim part face at sadi first position;

said second tirm part initiating in a second trim part face which is bent in order to be opposed to and parallel with said first trim part face; and said first and second trim part faces being transverse at about a right angle to a line of sight passing from said vantage point through said first position so that the line of sight is directed from said vantage point to the first trim part face beyond the inner surface of the body panel.

2. The trim assembly according to claim 1, wherein a clearacne between said first and second rim part faces is at a distance so that when the first trim part is detached from the inner surface, said second trim part face is adapted to restrain the first trim apart.

3. A trim assembly for the compartment of a motor vehicle adapted to accommodate a passenger at a predetermined vantage point comprising:

a first trim part attached on an inner surface of a body panel in the vehicle an forward of said vantage point extending partially and generally along the inner surface to one side and above said vantage point and terminating at a first position forward of said vantage point;

a second trim part attached on the inner surface of the body panel for extending along the inner surface from said first position and past said vantage point;

said first trim part being bent toward the inner surface of the body panel at an obtuse angle in order to form a first trim part face at said first position;

said second trim part initiating in a second trim part face which is bent in order to be opposed to and parallel with said first trim part face; and said first and second trim part faces defining a clearance therebetween, said faces being at an angle relative to the inner surface such that, upon detachment of the first trim part face from the inner surface, the second trim part face engages and restrains the first trim part from substantially protruding from said inner surface.

* * * * *